US010464469B2

(12) United States Patent
Ekladyous et al.

(10) Patent No.: US 10,464,469 B2
(45) Date of Patent: Nov. 5, 2019

(54) INDISCERNIBLE HEADLAMP ADJUSTER MECHANISM

(71) Applicant: FORD GLOBAL TECHNOLOGIES, LLC, Dearborn, MI (US)

(72) Inventors: Albert Ekladyous, Shelby Township, MI (US); Diane Marie LaHaie, Lake Orion, MI (US); Lisa Hohmann, Dearborn, MI (US); Kelley Maria Adams-Campos, Ferndale, MI (US); Matthew W. Roosen, Memphis, MI (US); John Matthew Teodecki, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 15/685,207

(22) Filed: Aug. 24, 2017

(65) Prior Publication Data
US 2019/0061601 A1 Feb. 28, 2019

(51) Int. Cl.
*B60Q 1/04* (2006.01)
*B60Q 1/05* (2006.01)
*B60Q 1/076* (2006.01)
*B60Q 1/00* (2006.01)

(52) U.S. Cl.
CPC .............. *B60Q 1/05* (2013.01); *B60Q 1/045* (2013.01); *B60Q 1/076* (2013.01); *B60Q 1/0064* (2013.01)

(58) Field of Classification Search
CPC ................... B60Q 1/045; B60Q 1/04
USPC ......................... 362/523, 507, 508
See application file for complete search history.

(56) References Cited

U.S. PATENT DOCUMENTS

| 4,674,013 | A | * | 6/1987 | Manzoni | B60Q 1/076 362/272 |
| 5,669,695 | A | * | 9/1997 | Parker | B60Q 1/0683 362/273 |
| 5,906,431 | A | | 5/1999 | Chianale et al. | |
| 5,951,157 | A | * | 9/1999 | Shirai | B60Q 1/0683 362/284 |
| 6,017,137 | A | | 1/2000 | Suehiro et al. | |
| 6,042,254 | A | * | 3/2000 | Burton | B60Q 1/0683 362/284 |
| 6,050,712 | A | * | 4/2000 | Burton | B60Q 1/0683 362/284 |

(Continued)

*Primary Examiner* — Paultep Savusdiphol
(74) *Attorney, Agent, or Firm* — Carlson, Gaskey & Olds, P.C.

(57) ABSTRACT

An apparatus, according to an exemplary aspect of the present disclosure includes, among other things, a lamp housing that houses a headlamp adjuster assembly moveable between an adjustment position and an inaccessible stowed position within the lamp housing, and a holder to hold the headlamp adjuster assembly in the adjustment position. The holder is selectively removable such that the headlamp adjuster assembly retracts to the inaccessible stowed position. A method according to an exemplary aspect of the present disclosure includes, among other things, biasing a headlamp adjuster toward the inaccessible stowed position, installing the holder to hold the headlamp adjuster external to the lamp housing against the biasing force, adjusting a position of a headlamp with the headlamp adjuster, and removing the holder such that the headlamp adjuster retracts to the inaccessible stowed position.

20 Claims, 3 Drawing Sheets

(56) References Cited

U.S. PATENT DOCUMENTS

| | | | | |
|---|---|---|---|---|
| 6,082,882 A * | 7/2000 | Akiyama | ............. | B60Q 1/0683 |
| | | | | 362/273 |
| 6,247,834 B1 * | 6/2001 | Suehiro | ................ | B60Q 1/0686 |
| | | | | 362/460 |
| 6,338,567 B1 | 1/2002 | Denley | | |
| 6,394,637 B1 | 5/2002 | Watanabe et al. | | |
| 6,773,153 B2 * | 8/2004 | Burton | ................ | B60Q 1/0683 |
| | | | | 362/528 |
| 7,066,632 B2 * | 6/2006 | Burton | ................ | B60Q 1/0683 |
| | | | | 362/508 |
| 7,153,012 B2 * | 12/2006 | Sakurai | ................ | B60Q 1/0683 |
| | | | | 362/523 |
| 7,182,491 B2 * | 2/2007 | Cajanek | ................ | B60Q 1/068 |
| | | | | 362/419 |
| 2002/0085385 A1 * | 7/2002 | Shirai | ................ | B60Q 1/0683 |
| | | | | 362/514 |

\* cited by examiner

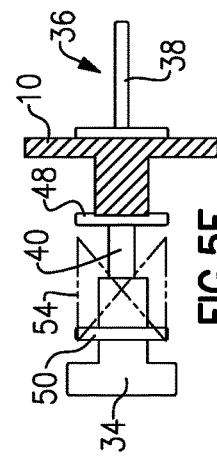
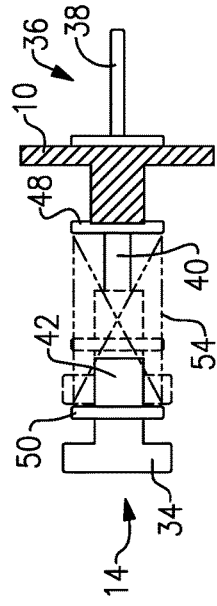
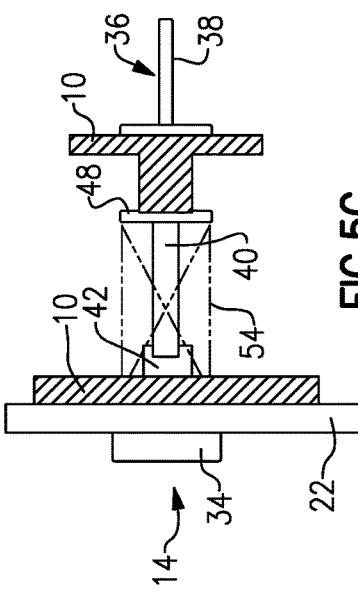
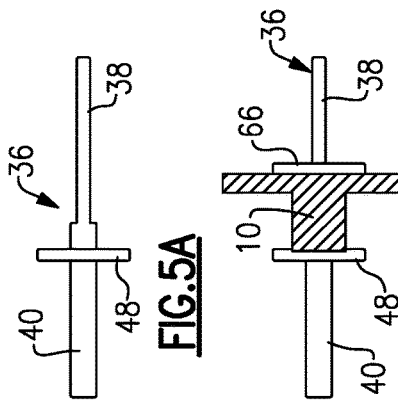
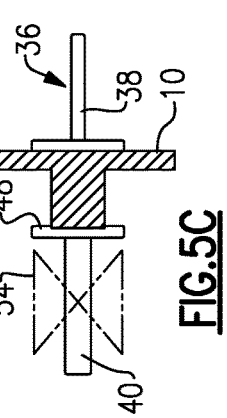

INDISCERNIBLE HEADLAMP ADJUSTER MECHANISM

TECHNICAL FIELD

This disclosure relates to an exemplary apparatus and method of providing a headlamp adjuster mechanism that is held in an adjustment position and which becomes inaccessible after a position of the headlamp has been adjusted to a desired position.

BACKGROUND

Vehicles include headlamps that need to have an external horizontal adjuster mechanism to aim a headlamp beam correctly in a horizontal (cross-car) direction. However, there are regulations that prohibit external horizontal adjuster mechanisms that are accessible by an end user. Typically, the headlamp will be aimed by a supplier during assembly and then a tamper-proof disabling device will be placed over the horizontal adjuster such that the headlamp position cannot be changed.

New emerging technologies in lighting may require vehicle assembly plants to aim the headlamps during vehicle production. This will require the tamper-proof device to be added at the plant itself, which presents several feasibility issues. These issues include lack of access to the adjuster at end-of-line on the vehicle, additional labor, and the plants often do not have any facilities to add parts at end-of-line after the headlamp aiming has been completed. Further, the disabling process is an important characteristic whereby omission of the tamper-proof device can lead to recalls. Significant investment in facilities and tooling is needed to error proof the disabling process.

SUMMARY

An apparatus according to an exemplary aspect of the present disclosure includes, among other things, a lamp housing that houses a headlamp adjuster assembly moveable between an adjustment position and an inaccessible stowed position within the lamp housing, and a holder to hold the headlamp adjuster assembly in the adjustment position. The holder is selectively removable such that the headlamp adjuster assembly retracts to the inaccessible stowed position.

In a further non-limiting embodiment of the foregoing apparatus, the headlamp adjuster assembly includes an adjuster cap coupled to a shaft to adjust an aiming position of a headlamp.

In a further non-limiting embodiment of either of the foregoing apparatus, the headlamp adjuster assembly includes a resilient member that biases the adjuster cap to the stowed position.

In a further non-limiting embodiment of any of the foregoing apparatus, the holder comprises a pin that holds the adjuster cap in an exposed position to interact with an aiming tool.

In a further non-limiting embodiment of any of the foregoing apparatus, the lamp housing includes guides to guide the pin to engage the adjuster cap.

In a further non-limiting embodiment of any of the foregoing apparatus, the pin includes a tool guide to guide the aiming tool to engage the adjuster cap.

In a further non-limiting embodiment of any of the foregoing apparatus, the adjuster tool interacts with the adjuster cap and shaft to adjust a horizontal aiming position of the headlamp.

An apparatus according to another exemplary aspect of the present disclosure includes, among other things, a lamp housing, a headlamp adjuster moveable between an adjustment position and an inaccessible stowed position within the lamp housing, a resilient member that biases the headlamp adjuster to the inaccessible stowed position, and a holder that holds the headlamp adjuster in the adjustment position against a bias of the resilient member.

In a further non-limiting embodiment of any of the foregoing apparatus, the holder is selectively removable such that the headlamp adjuster retracts to the inaccessible stowed position.

In a further non-limiting embodiment of any of the foregoing apparatus, the headlamp adjuster comprises an adjustment cap that cooperates with an adjuster shaft to adjust a horizontal aiming position of a headlamp.

In a further non-limiting embodiment of any of the foregoing apparatus, the holder comprises a pin that is located external to the lamp housing, the pin holding the adjustment cap external of the lamp housing in the adjustment position.

In a further non-limiting embodiment of any of the foregoing apparatus, the adjustment cap is moveable in a longitudinal direction between the adjustment position and inaccessible stowed position, and wherein the pin is pulled in a vertical direction to release the adjustment cap.

In a further non-limiting embodiment of any of the foregoing apparatus, the lamp housing defines an internal cavity that completely encloses the headlamp adjuster when in the inaccessible stowed position.

A method according to another exemplary aspect of the present disclosure includes the steps of, among other things: (a) biasing a headlamp adjuster toward an inaccessible stowed position within a lamp housing, (b) installing a holder to hold the headlamp adjuster external to the lamp housing against the biasing force of step (a); (c) adjusting a position of a headlamp with the headlamp adjuster; and (d) subsequently removing the holder such that the headlamp adjuster retracts to the inaccessible stowed position.

In a further non-limiting embodiment of the foregoing method, the holder comprises a pin, and the method further includes guiding the pin along guides on the lamp housing to engage and hold the headlamp adjuster in an adjustment position external to the lamp housing.

In a further non-limiting embodiment of either of the foregoing methods, the method includes guiding an aiming tool along a guide on the pin to engage the headlamp adjuster to adjust an aiming position of the headlamp.

In a further non-limiting embodiment of any of the foregoing methods, the method includes adjusting a horizontal aiming position of the headlamp.

In a further non-limiting embodiment of any of the foregoing methods, the method includes moving the holder along a vertical axis and moving the headlamp adjuster along a longitudinal axis.

In a further non-limiting embodiment of any of the foregoing methods, the method includes defining an internal cavity within the lamp housing and retracting the headlamp adjuster completely within the internal cavity during step (d) such that an aiming tool can no longer access the headlamp adjuster.

In a further non-limiting embodiment of any of the foregoing methods, the method includes providing the headlamp adjuster with an adjustment cap coupled to a shaft that adjusts a position of the headlamp, and installing a resilient member to surround the shaft and react between the adjustment cap and the lamp housing to bias the headlamp adjuster to the inaccessible stowed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5A shows an initial step in the assembly process of the adjuster mechanism of FIG. 1.

FIG. 5B shows another assembly step.

FIG. 5C shows another assembly step.

FIG. 5D shows another assembly step.

FIG. 5E shows another assembly step.

FIG. 5F shows another assembly step.

FIG. 5G shows another assembly step.

DETAILED DESCRIPTION

This disclosure details exemplary apparatus and methods of providing a headlamp adjuster mechanism that is held in an adjustment position and which becomes inaccessible after a position of the headlamp has been adjusted to a desired position.

Figure 1:
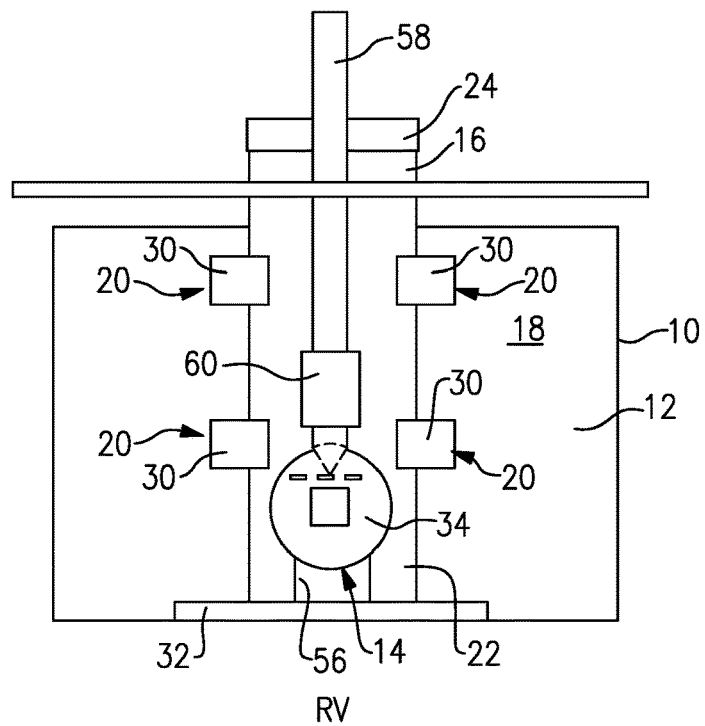
FIG. 1 illustrates a schematic rear view of a headlamp housing with an adjusting tool and adjuster mechanism incorporating the subject invention.
Figure 2:
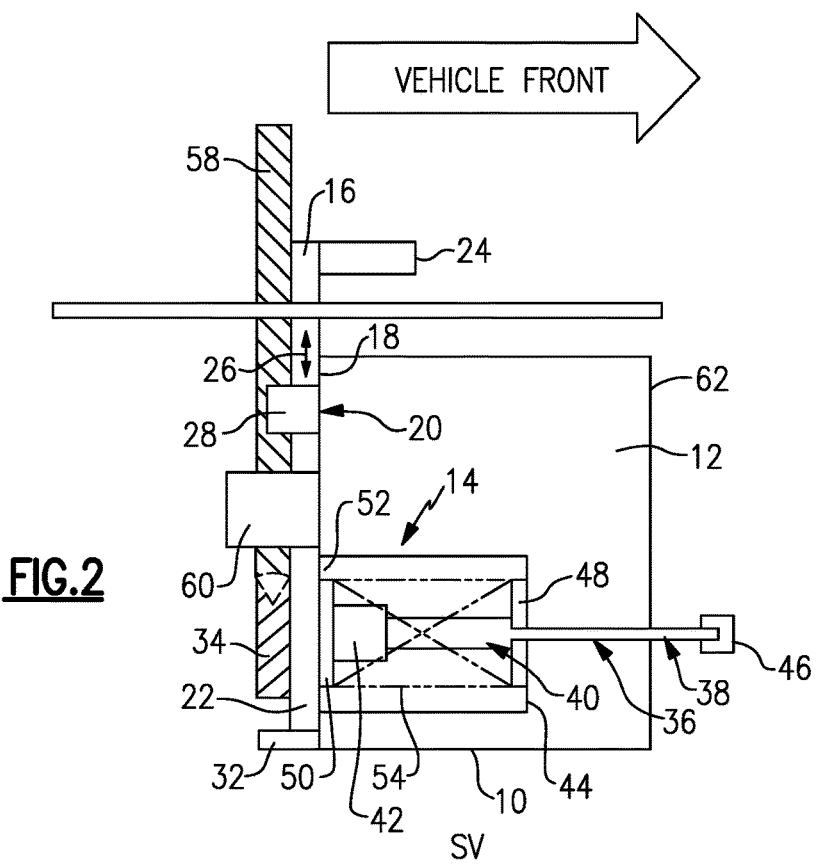
FIG. 2 is a side view of the housing, tool, and adjuster mechanism of FIG. 1.
Figure 3:
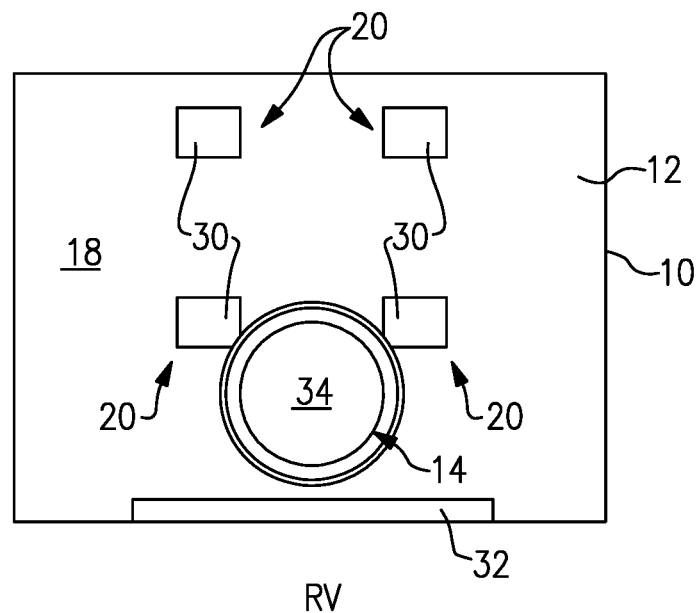
FIG. 3 is a view similar to FIG. 1 but with the tool removed.

As shown in FIGS. 1-2, a headlamp housing 10 includes an internal cavity 12 that houses a headlamp adjuster assembly 14. The headlamp adjuster assembly 14 is used to aim a headlamp beam correctly in a horizontal (cross-car) direction. The headlamp adjuster assembly 14 is moveable in a longitudinal direction (along a length of a car) between an adjustment position (FIGS. 1-2) and an inaccessible stowed position (FIGS. 3-4) within the lamp housing 10. A holder 16 is used to hold the headlamp adjuster assembly 14 in the adjustment position. The holder 16 is selectively removable from the lamp housing 10 such that the headlamp adjuster assembly 14 retracts to the inaccessible stowed position.

The lamp housing 10 includes an external and rear facing surface 18 that supports the holder 16. In one example, one or more guides 20 are located on the rear facing surface 18 to guide the holder 16. In one example, the holder 16 comprises a pin 22, similar to a "grenade pin," which includes a handle 24 that can be gripped with a hand or tool to move the pin 22 up and down along a vertical axis/vertical direction (along a height of a car) as indicated by arrow 26 (FIG. 2). In one example, the guides 20 comprise protrusions positioned on opposing sides of the pin 22 to define a slot, gap or opening between the housing surface 18 and the guides 20. Each guide 20 includes a first portion 28 that extends outwardly away from the housing surface 18 and a second portion 30 extending perpendicular to the first portion 28. The second portions 30 of the opposing guides 20 extend inwardly toward each other. The second portions 30 are spaced from the housing surface 18 to define the opening through which the pin 22 slides in a vertical direction to engage the headlamp adjuster assembly 14.

The pin 22 is guided by the guides 20 until a bottom of the pin 22 hits a positive stop 32 on the lamp housing 10. In one example, the positive stop 32 comprises a ledge that extends outwardly of the rear facing surface 18 of the lamp housing 10.

The headlamp adjuster assembly 14 is completely enclosed within the internal cavity 12 when in the inaccessible stowed position. The pin 22 holds the headlamp adjuster assembly 14 in the adjustment position until the headlamp beam can be aimed in the desired horizontal position. In one example, the headlamp adjuster assembly 14 includes an adjuster cap 34 that is attached or coupled to an adjuster shaft 36. The adjuster cap 34, also referred to as a bottle cap adjuster slider, has a diameter or outer dimension that is greater than a diameter or outer dimension of the shaft 36. In one example the shaft 36 includes a round threaded adjuster shaft portion 38 that transitions into a square adjuster drive shaft portion 40. The drive shaft portion 40 connects to an adjuster portion 42 having an outer dimension larger than the drive shaft portion 40 but less than the adjuster cap 34.

Figure 4:
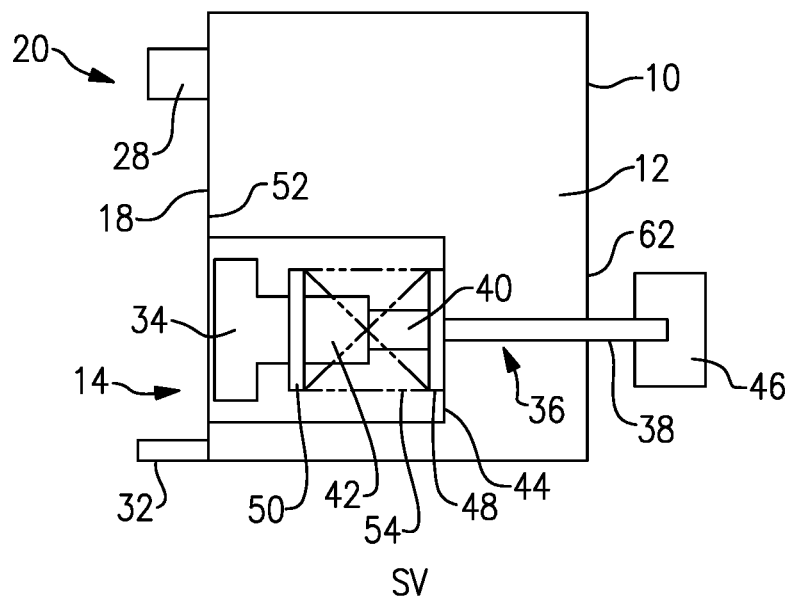
FIG. 4 is a view similar to FIG. 2 but with the tool removed.

The headlamp housing 10 includes an internal wall 44 through which the round threaded adjuster shaft portion 38 extends to adjust the horizontal aiming position of a headlamp 46. In one example, a first retainer 48 is held against the internal wall 44 and a second retainer 50 is held against an internal wall surface 52 that is at a rear of the housing 10. The shaft portion 38 extends through the first retainer 48 and the second retainer 50 surrounds the adjuster portion 42 which is located on an opposite side of the pin 22 from the cap 34. A resilient member 54, such as a coil spring, linear extension spring, or other similar member for example, has one end engaging the first retainer 48 and an opposite end engaging the second retainer 50. The resilient member 54 provides a biasing force that retracts the adjuster cap 34 into the housing 10 as shown in FIG. 4.

During assembly, the adjuster cap 34 and resilient member 54 are extended against a biasing force of the spring such that the adjuster cap 34 is pulled through an opening in the rear wall of the housing 10 and such that the cap 34 is externally located from the housing 10. The pin 22 is slid through the guides 20 to engage the cap 34 and hold the cap 34 in the extended adjustment position as shown in FIGS. 1-2. The distal end of the pin 22 includes an open-ended opening or slot 56 that receives the cap 34 and engages a rear side of the cap 34 to prevent the cap 34 from retracting into the headlamp housing 10.

When the adjuster cap 34 is in the adjustment position, an aiming tool 58 can be installed to adjust the horizontal aim of the headlamp 46. The pin 22 includes one or more guides 60 that extend outwardly of the pin 22 to guide the tool 58 to engage the adjuster cap 34. In one example, the guide 60 comprises a sleeve that receives the pin 22 such that the tool 58 cannot be rotated relative to the pin 22. The tool 58 cooperates with the adjuster 34 which in turn drives the drive shaft portion 40 and associated round threaded adjuster shaft portion 38 to adjust a horizontal aiming position of the headlamp 46 which is at a vehicle forward direction or front face 62 of the lamp housing 10. Once the headlamp 46 is in the desired position, the tool 58 is withdrawn from the pin 22 and the pin 22 can be withdrawn from the housing 10.

The pin 22 can then be discarded or recycled back to the supplier. When the pin 22 is removed, the biasing force of the resilient member 54 pulls the adjuster cap 34 into the internal cavity 34 such that the cap 34 is no longer accessible by the tool. This provides a tamper-proof feature such that the position of the headlamp cannot be changed by an end user either on the vehicle or off the vehicle.

The assembly of the adjuster assembly 14 is shown in FIGS. 5A-5G. As shown in FIG. 5A, the first spring retainer 48 is pushed on to the shaft 36. In one example, the retainer 48 is held in place on the drive shaft portion 40 with locking barbs. Next, as shown in FIG. 5B, the shaft 36 is pushed on to the lamp housing 10 and is locked in place with another retainer 66 via locking barbs. Next, the resilient member 54 has one end fixed to the first spring retainer 48 (FIG. 5C).

In a secondary assembly process shown in FIG. 5D, the second retainer 50 is mounted to the adjuster portion 42 and spaced from the adjuster cap 34. Next, as shown in FIG. 5E, the adjuster portion 42 and second retainer 50 are coupled to the resilient member 54. In one example, a hand tool (not shown) is used to support the resilient member 54 during this assembly process. Next, the resilient member 54 is stretched with a hand tool (not shown) to expose the adjuster cap 34 in the extended adjustment position (FIG. 5F). Finally, the adjustment cap 34 and resilient member 54 are locked to the lamp housing 10 with the pin 22 to hold the cap 34 in the exposed adjustment position for headlamp aiming.

The subject invention is directed to a headlamp adjuster assembly 14 that provides a quick release adjuster disabling feature. No tools are required to disable the device as the pin handle 24 is simply pulled out of the lamp housing 12 and the adjuster cap 34 automatically retracts. When installed, the pin 22 is easily visible and accessible to plant operation members. The subject assembly 14 adds only a minimal amount of labor and cost. The pin 22 itself can be recycled to reduce cost. Removed pins 22 can be counted and compared to vehicle production numbers to provide further error proofing. Further, as this assembly 14 is solely used for horizontal adjustment it cannot be mixed up with vertical headlamp adjustment and disabling.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a lamp housing;
   a headlamp adjuster assembly moveable between an adjustment position and an inaccessible stowed position within the lamp housing; and
   a holder to hold the headlamp adjuster assembly in the adjustment position, the holder being selectively removable such that the headlamp adjuster assembly retracts to the inaccessible stowed position.

2. The apparatus according to claim 1, wherein the headlamp adjuster assembly includes an adjuster cap coupled to a shaft to adjust an aiming position of a headlamp.

3. The apparatus according to claim 2, wherein the headlamp adjuster assembly includes a resilient member that biases the adjuster cap to the stowed position.

4. The apparatus according to claim 3, wherein the holder comprises a pin that holds the adjuster cap in an exposed position to interact with an aiming tool.

5. The apparatus according to claim 4, wherein the lamp housing includes guides to guide the pin to engage the adjuster cap.

6. The apparatus according to claim 4, wherein the pin includes a tool guide to guide the aiming tool to engage the adjuster cap.

7. The apparatus according to claim 6, wherein the aiming tool interacts with the adjuster cap and shaft to adjust a horizontal aiming position of the headlamp.

8. An apparatus, comprising:
   a lamp housing;
   a headlamp adjuster moveable between an adjustment position and an inaccessible stowed position within the lamp housing;
   a resilient member that biases the headlamp adjuster to the inaccessible stowed position; and
   a holder that holds the headlamp adjuster in the adjustment position against a bias of the resilient member.

9. The apparatus according to claim 8, wherein the holder is selectively removable such that the headlamp adjuster retracts to the inaccessible stowed position.

10. The apparatus according to claim 9, wherein the headlamp adjuster comprises an adjustment cap that cooperates with an adjuster shaft to adjust a horizontal aiming position of a headlamp.

11. The apparatus according to claim 10, wherein the holder comprises a pin that is located external to the lamp housing, the pin holding the adjustment cap external of the lamp housing in the adjustment position.

12. The apparatus according to claim 11, wherein the adjustment cap is moveable in a longitudinal direction between the adjustment position and inaccessible stowed position, and wherein the pin is pulled in a vertical direction to release the adjustment cap.

13. The apparatus according to claim 8, wherein the lamp housing defines an internal cavity that completely encloses the headlamp adjuster when in the inaccessible stowed position.

14. A method comprising:
   (a) biasing a headlamp adjuster toward an inaccessible stowed position within a lamp housing;
   (b) installing a holder to hold the headlamp adjuster external to the lamp housing against the biasing force of step (a);
   (c) adjusting a position of a headlamp with the headlamp adjuster; and
   (d) subsequently removing the holder such that the headlamp adjuster retracts to the inaccessible stowed position.

15. The method according to claim 14 wherein the holder comprises a pin, and including guiding the pin along guides on the lamp housing to engage and hold the headlamp adjuster in an adjustment position external to the lamp housing.

16. The method according to claim 15 including guiding an aiming tool along a guide on the pin to engage the headlamp adjuster to adjust an aiming position of the headlamp.

17. The method according to claim 14 wherein step (c) includes adjusting a horizontal aiming position of the headlamp.

18. The method according to claim 14 including moving the holder along a vertical axis and moving the headlamp adjuster along a longitudinal axis.

19. The method according to claim 14 including defining an internal cavity within the lamp housing and retracting the headlamp adjuster completely within the internal cavity during step (d) such that an aiming tool can no longer access the headlamp adjuster.

20. The method according to claim 14 including providing the headlamp adjuster with an adjustment cap coupled to a shaft that adjusts a position of the headlamp, and installing a resilient member to surround the shaft and react between the adjustment cap and the lamp housing to bias the headlamp adjuster to the inaccessible stowed position.

\* \* \* \* \*